Patented Mar. 24, 1942

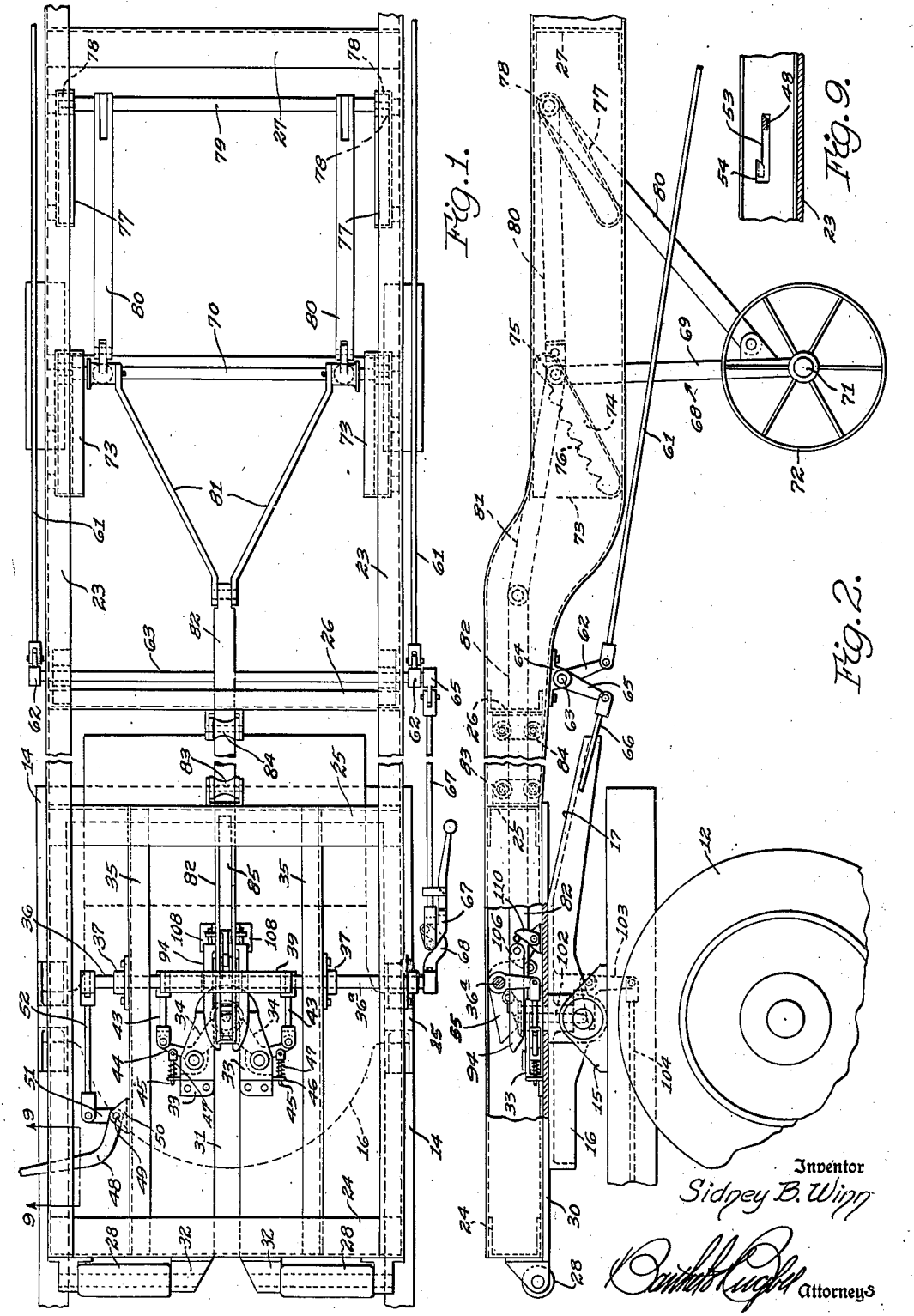

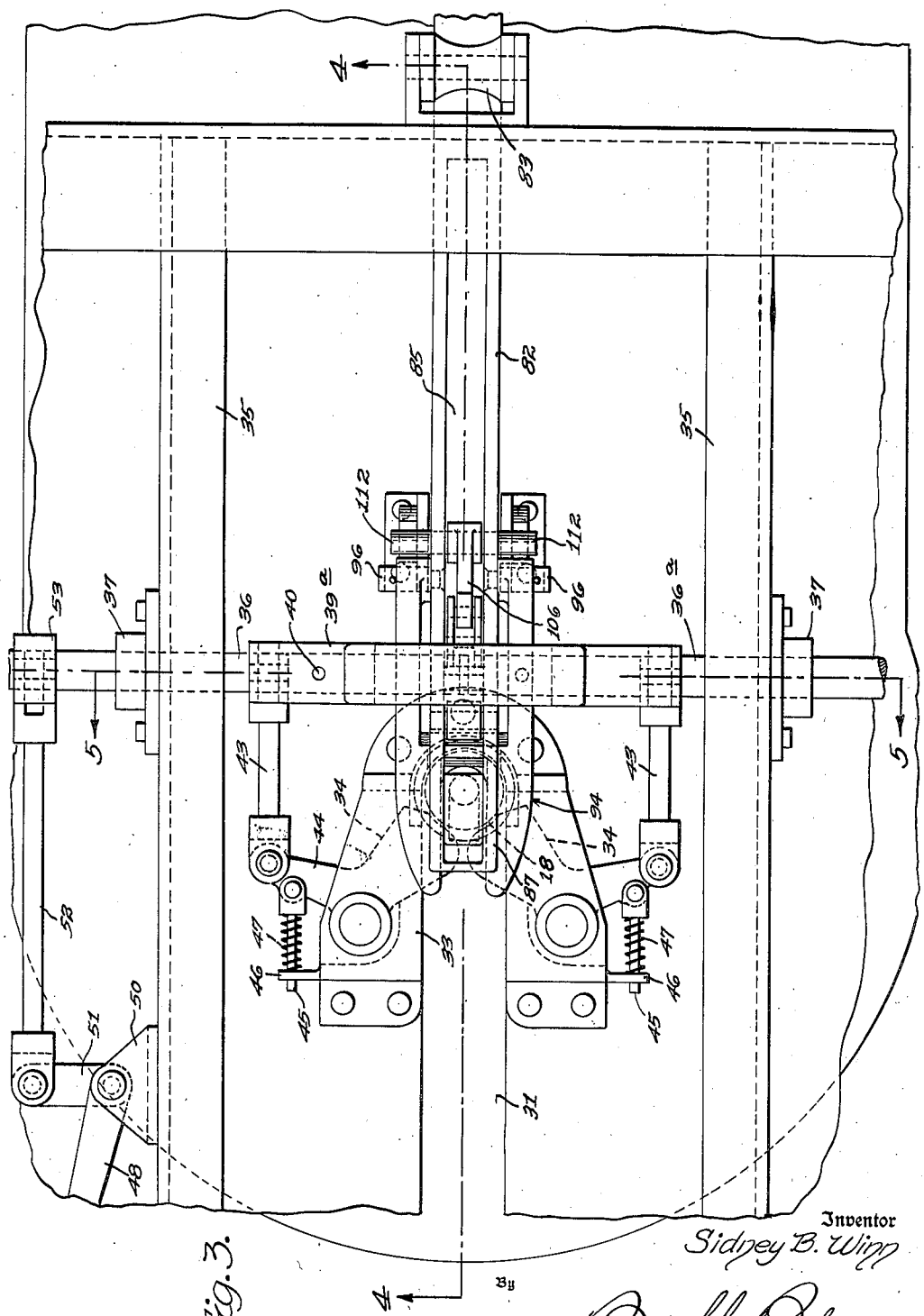

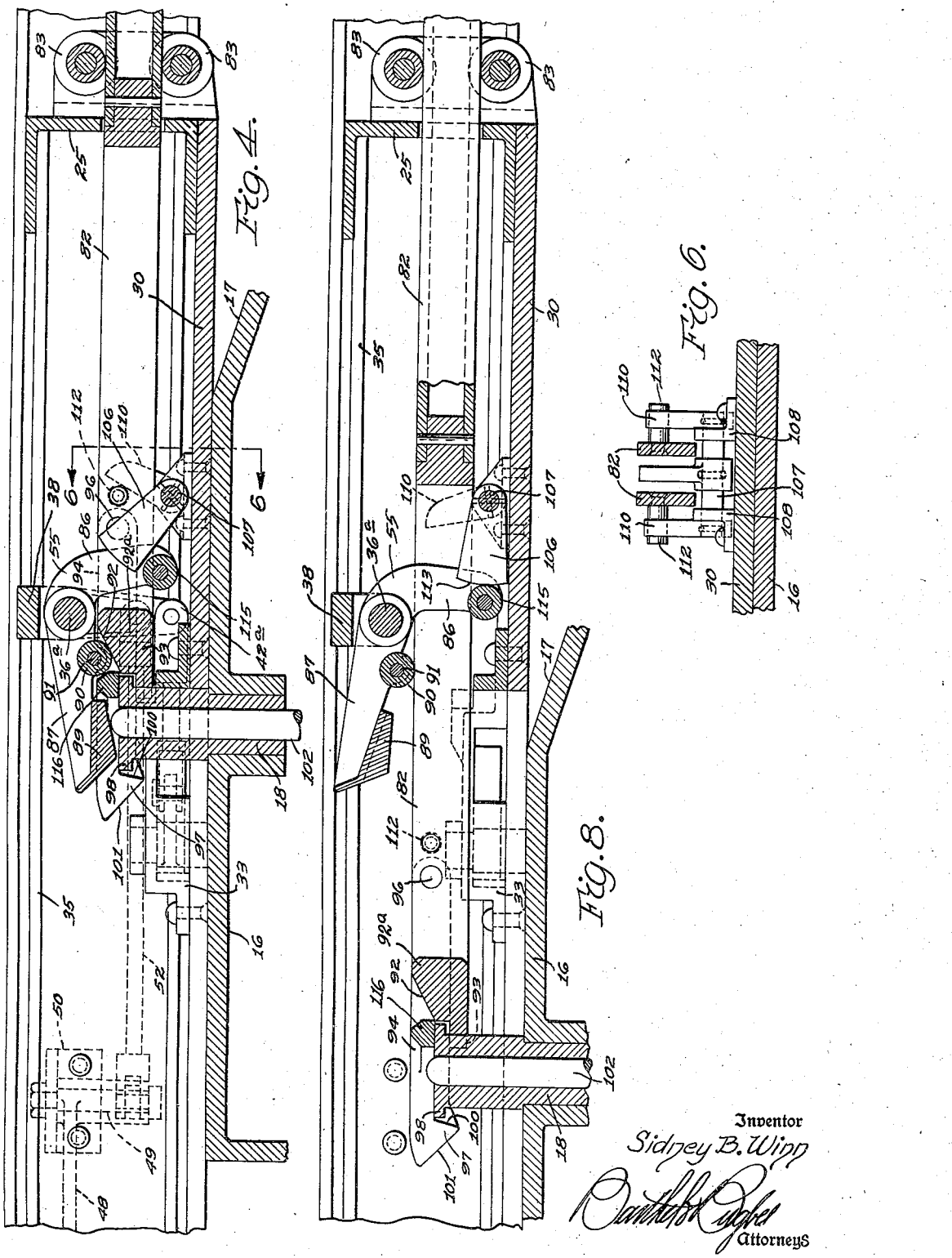

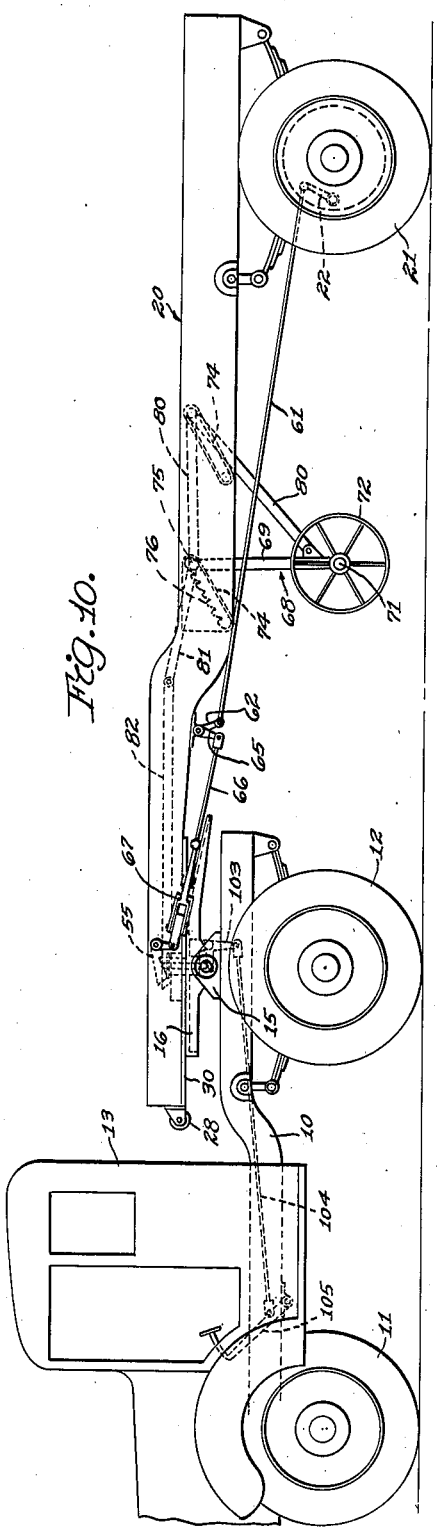
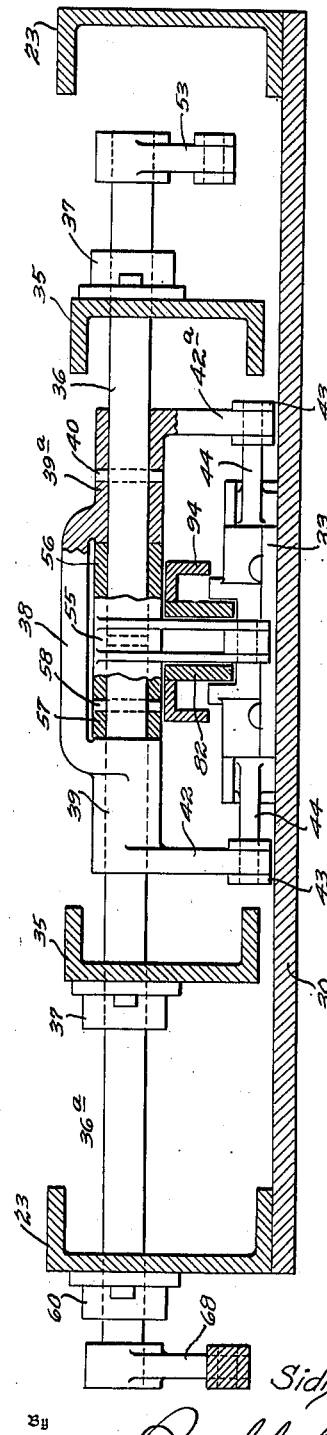

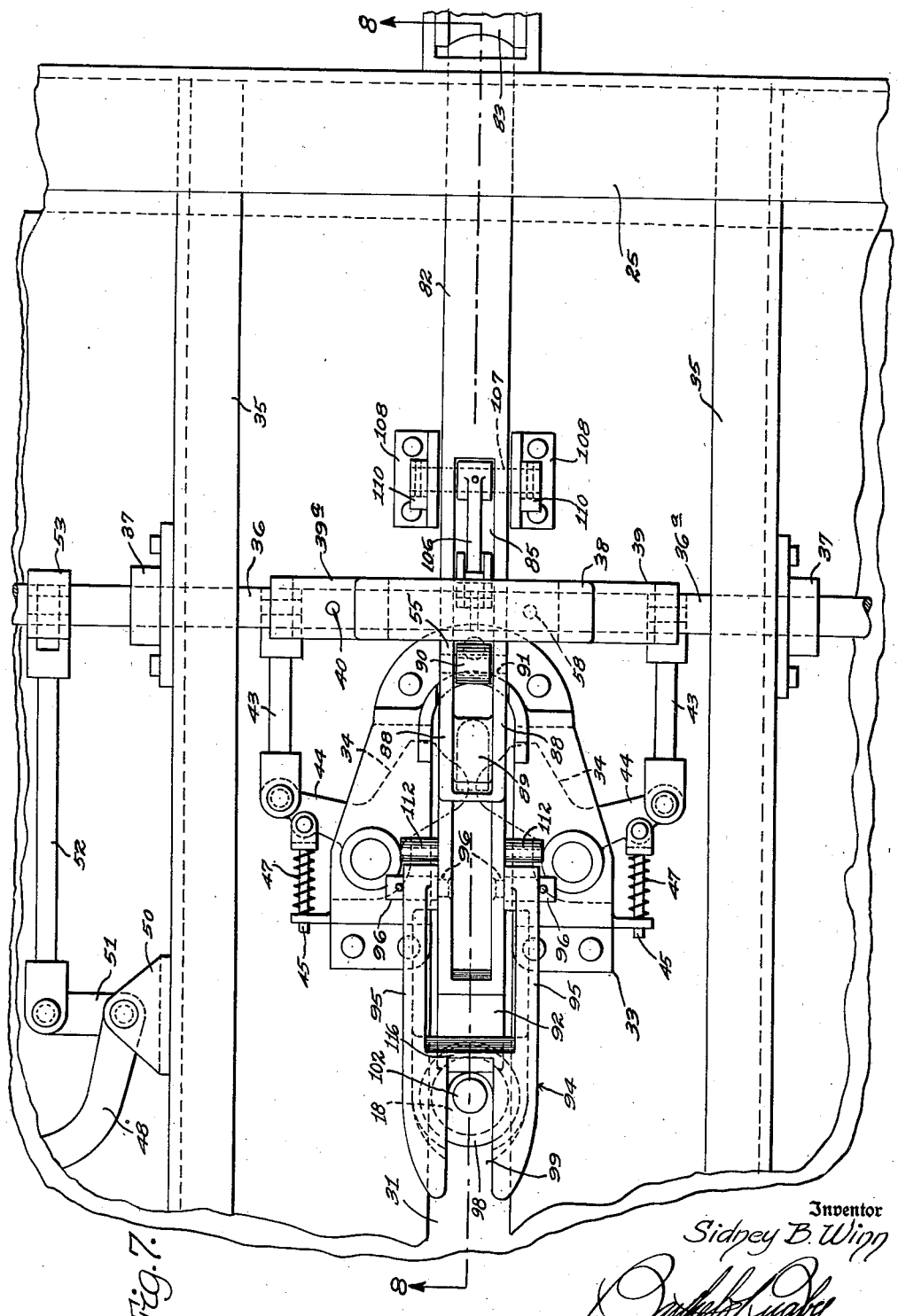

2,277,179

UNITED STATES PATENT OFFICE 2,277,179

TRACTOR-TRAILER VEHICLE

Sidney B. Winn, Lapeer, Mich.

Application February 24, 1941, Serial No. 380,324

9 Claims. (Cl. 280—33.1)

This invention relates generally to vehicles and more particularly to tractor-trailer vehicles.

It is an object of the present invention to provide new and improved mechanism for automatically setting and holding trailer brakes applied upon movement of a tractor away from a trailer.

Another object of the invention is to provide new and improved mechanism for automatically releasing the rear wheel brakes of a trailer and operable upon movement of a tractor relative to the trailer, preparatory to coupling thereto.

Another object of the invention is to provide in a trailer having rear wheel brakes new and improved brake setting and releasing mechanism operating respectively in accordance with lowering and raising of a prop for the forward end of the trailer.

A further object of the invention is to provide in a trailer having a prop which is descendable by gravity, new and improved means for initially starting descent of the prop and effective upon and by movement of a tractor away from the trailer.

Other objects of the invention will become apparent from the following description taken in connection with the following drawings in which:

Fig. 1 is a fragmentary top plan view of a trailer and tractor shown coupled together;

Fig. 2 is a fragmentary side view of the tractor and trailer having certain parts broken away and in section;

Fig. 3 is an enlarged fragmentary plan view of the tractor and trailer;

Fig. 4 is a fragmentary sectional view of the tractor and trailer, taken along the line 4—4 of Fig. 3, showing the tractor and trailer coupled together;

Fig. 5 is a cross sectional view of the tractor and trailer, taken along the line 5—5 of Fig. 3;

Fig. 6 is a detailed cross sectional view, taken along the line 6—6 of Fig. 4;

Fig. 7 is a top plan fragmentary view similar to Fig. 3 but showing the tractor and trailer in uncoupled position;

Fig. 8 is a view shown in longitudinal section of the tractor and trailer, taken along the line 8—8 of Fig. 7;

Fig. 9 is a detailed sectional view, taken along the line 9—9 of Fig. 1; and

Fig. 10 is a side elevation showing the tractor and trailer in coupled position.

Referring to the drawings by characters of reference, the tractor may be of any suitable type and, in the present instance, includes a frame 10 supported by front wheels 11 and rear wheels 12, the frame 10 having a driver's cab 13 rigidly mounted thereon. The frame 10 includes a pair of spaced longitudinal frame members 14 adjacent the rear ends of which is rigidly secured respectively a pair of oppositely disposed brackets 15 to support a fifth wheel 16 which is arranged to tilt about a transverse axis. The fifth wheel 16 is in the form of a plate having a downturned flange extending therearound and having a rearwardly and downwardly extending, inclined skid surface 17 up which the forward end of a trailer rides onto the fifth wheel 16 preparatory to coupling of the vehicles together. Carried by and rigidly secured to the fifth wheel 16 there is a king pin 18 which projects above the upper surface of the fifth wheel and is adapted, as will hereinafter be seen, to cooperate with coupling means on the trailer for releasably coupling the tractor and trailer together.

The trailer includes a frame 20 supported in part by rear wheels 21 which are provided with brakes, not shown, but which may be of any suitable type, operated by a lever 22, see Fig. 10. While only one of the brake operating levers 22 is shown, it will be understood that there is one of such levers for each of the trailer rear wheels 21. The trailer frame 20 includes spaced longitudinal frame members 23 which are rigidly secured together by longitudinally spaced cross members 24, 25, 26 and 27. A skid and bearing plate 30 is rigidly secured to the underside of the trailer frame adjacent the front end thereof to seat on the tractor fifth wheel and is provided with a slot 31 which extends longitudinally and centrally of the frame to receive the tractor king pin 18. The opening of the slot 31 is formed by forwardly diverging walls of a pair of laterally spaced brackets 32 which support the inner or opposed ends of a pair of rollers 28 which are mounted on the front end of the trailer frame, the diverging entrance to the slot 31 aiding in directing the king pin 18 thereinto when the tractor is backed beneath the trailer.

Mounted on and rigidly secured to the plate 30 a bracket 33 is provided having a U-shaped slot overlying and aligning with the slot 31 in the trailer skid plate 30, and pivoted to the bracket 33 is a pair of coupling members 34 which are cooperable to provide jaw means for releasably holding the king pin 18 against withdrawal from the slot 31. Disposed inwardly of the trailer frame members 23 there is a pair of substantially parallel channel frame members 35 which are rigidly secured at their forward ends to the frame cross member 24 and at their rear ends to the frame cross member 25. These inner frame members 35 are disposed above the trailer plate 30 and support a pair of axially aligned transverse shafts 36 and 36a which are journalled in aligning bores of a pair of brackets 37 respectively and rigidly secured to the frame members 35. A yoke 38 is provided with spaced, connected together bosses 39 and 39a having aligning bores to receive the shaft 36 to which the yoke is pinned by a pin 40 extending transversely through the boss 39a and shaft 36. As shown in Fig. 5, the yoke 38 is disposed between the inner longitudinal frame members 35 and from each of the bosses 39 and 39a there are depending arms 42 and 42a, the arms 42 and 42a being connected by links 43 respectively to arms 44 of the coupling members 34. Also pivotally connected to each of the arms 44, there is a pin 45 which is slidably received and guided in a flange 46 formed out of each of the brackets 33. Surrounding each of the pins 45 there is a helical coil spring 47, these springs acting to swing the coupling members 34 inwardly into coupled position or in the path of the tractor king pin. A manually operable arm or handle 48 is provided for moving the coupling members 34 apart to release the king pin and the handle 48 may be mounted by means of a pin 49 on a bracket 50 which may be rigidly secured to one of the longitudinal trailer frame members 35. An arm 51 integral with the handle 48 extends laterally from the adjacent frame member 35 and is pivoted by a link 52 to and adjacent the lower end of a lever 53 which is fixed on the shaft 36 to which the yoke arm 42a is also fixed. Thus, it will be seen that by pulling the handle 48 in a clockwise direction, facing Figs. 1 and 3, the shaft 36 will be rotated and through the yoke 38 the coupling members 34 will be spread apart or away from each other to effect uncoupling of the vehicles. The operating handle 48 extends through and is movable in a longitudinal slot 53, see Fig. 9, provided in the adjacent side member 23 of the trailer frame, the slot 53 being provided at the forward end thereof with an upwardly directed offset 54 to provide a retaining notch for the handle thereby releasably holding the coupling members 34 spread apart or in their uncoupled position.

Mounted on the shaft 36a between the yoke bosses 39 and 39a there is a lever 55 having oppositely directed hollow bosses 56 and 57 respectively receiving the inner or opposed ends of the shafts 36 and 36a. The inner end of the shaft 36 is freely supported in the lever boss 56 as a bearing such that the lever 55 and the shaft 36 are relatively rotatable. Through the other lever boss 57 and through the shaft 36a a transverse pin 58 is provided so that the lever 55 and the shaft 36a will rotate together. The outer end of the shaft 36a extends through one of the trailer frame members 23 and through a bushing 60 which is rigidly secured to and outwardly of the frame member 23. Each of the brake operating levers 22 for the trailer rear wheels is connected by a connecting link 61 to levers 62 which are fixed respectively to the opposite ends of a transverse shaft 63, disposed intermediate the length of the trailer frame. The shaft 63 is rotatably mounted in brackets 64 which are rigidly secured to and depend from the trailer longitudinal frame members 23. Also fixed to the rotatable shaft 63, a lever 65 is provided and is connected by a link 66 to a manually operable toggle device 67 which in turn is connected to a lever 68 fixed to the rotatable shaft 36a. As will later be seen, the toggle device 67 is a manually operable means to release or set the rear wheel trailer brakes when the trailer is detached from the tractor or such as when it is desired to move the trailer without using a tractor.

The forward end of the trailer frame is supported by a prop, designated in general by the numeral 68, when the tractor is detached from the trailer, the prop being retractible to a raised position in which it is held when the tractor is supporting the front end of the trailer. In the present instance, the prop 68 includes a pair of transversely spaced, upright supports 69 which are connected together at their upper ends by a cross bar 70 and are rigidly connected together at their lower ends by a shaft 71 on which ground engaging wheels 72 are mounted. A pair of risers 73 are rigidly secured respectively to and inwardly of the trailer frame members 23 providing inclines 74 for rollers 75 which are mounted on opposite ends of the connecting bar or rod 70. The risers 73 are further provided with a plurality of downwardly facing notches 76 arranged on an incline corresponding to the roller tracks 74 to receive the rod 70 when the tractor withdraws from beneath the trailer. A pair of guideways 77 secured respectively to the frame members 23 is provided rearwardly of the risers 73 to receive rollers 78 mounted on opposite ends of a transversely extending rod 79 which is connected to the prop uprights 69 by a pair of spaced angle braces 80. A pair of links 81 connect the prop rod 70 to the rear end of a longitudinally movable push rod 82 which is pushed rearwardly by the tractor king pin 18 to raise the prop 68 as the tractor backs into or beneath the trailer preparatory to coupling thereto.

The push rod 82 is received and guided for reciprocal movement between two pairs of rollers 83 and 84 which are spaced longitudinally on the frame and are mounted respectively on the trailer frame cross members 25 and 26. At its forward end, the rod 82 is provided with a longitudinally extending clearance slot 85 and the lever 55 is provided with a downwardly extending arm 86 positioned freely in the slot 85. The lever 55 is provided with a second arm 87 which extends toward the front of the trailer, the lever 55 having spaced, parallel side members 88 joined together at their forward ends by a bottom wall 89. A roller 90 disposed between the lever arm side members 88 is mounted on a pin 91 having its opposite ends secured in and to the side members 88, the roller 90 being provided for abutment with an inclined cam surface 92 provided on the abutment 92a on the forward end of the push rod 82. The width of the roller 90 is less than that of the slot 85. The front end of the push rod 82 is provided with an arcuate socket 93 in which the king pin 18 engages to push the rod 82 rearwardly.

Carried by the rod 82 at the front end thereof is a hook member 94 which is provided with spaced rearwardly extending side members 95 straddling a front end portion of the rod 82, the hook member 94 being pivoted adjacent the rear ends of its side members 95 to opposite sides of the rod 82 by pivot pins 96. A double-beveled transverse member 116 joins the side members 95 and rests upon the king pin upper flange 98. The hook member 94 at its forward end is provided with a downwardly extending hook portion 97 adapted to hook forwardly of an upper flange 98 on the king pin 18 for a purpose to be hereinafter described in detail. In the present instance, the hook portion 97 is of arcuate form but is intersected by a slot 99 extending longitudinally of the hook member and through the front end thereof. The rearwardly facing surfaces of the hook portion 97, as at 100, are inclined downwardly and outwardly or forwardly and the front end of the hook member is provided with downwardly and rearwardly inclined surfaces 101. The forward inclined surfaces 101 constitute cam surfaces which are engaged by the king pin 18 as the tractor is backed into the trailer causing the hook member to be swung upwardly to permit the king pin to engage in the rod socket 93 after which the hook member swings downwardly by gravity in the position shown in Fig. 8 with the hook portion 97 hooked over and forwardly of the king pin flange 98.

The king pin 18 is an open ended tubular member in which a vertically reciprocal push rod 102 is provided, the upper end of the rod 102 projecting above the king pin into the hook member slot 99 to engage the lower surface of the wall 89 of lever 55 which lever is operable to actuate the trailer rear wheel brakes. A bell crank lever 103 pivoted to and beneath the tractor fifth wheel 16 is provided for raising the push rod 102 against the opposition of the usual brake release springs (not shown) of the trailer brakes. A connecting rod 104 connects the bell crank lever 103 to a foot pedal lever arm 105 which is operated by the driver in the tractor cab 13.

Below the rod 82 and rearwardly of the lever 55, a releasable latch or lock member 106 is provided to hold the lever 55 in brake applying position in accordance with and controlled by the lowering operation of the trailer prop. The latch member 106 is fixed at one end thereof to a rotatable shaft 107, the latch member 106 being located immediately beneath the opening 85 in the prop push rod 82, which opening provides clearance to permit upward swinging movement of the latch member. The shaft 107 extends transversely of and beneath the push rod 82 and is supported by a pair of laterally positioned brackets 108 which seat on and are riveted or otherwise suitably secured to the trailer skid plate 30. To opposite ends of the shaft 107, outwardly of the brackets 108, is pinned or otherwise suitably secured, a pair of latch operating arms 110 which are adapted to be engaged and be moved by laterally extending pins 112 carried by the rod 82 adjacent the rear end of the hook member 94. The latch member 106 is in the form of an arm having a curved end surface 113 for rolling engagement with the roller 115 carried by and adjacent the lower end of the lever arm 86. The lever arm 86 is bifurcated to receive the roller 115 therebetween and to provide clearance for the end portion of the latch member 106.

*Operation*

When the tractor is detached from or is not supporting the front end of the trailer, the prop 68 supports the forward end of the trailer and other moving or operating parts of the trailer will be in the positions shown in Fig. 8. When the tractor is backed into the trailer, the front end of the trailer rides up the rearwardly and downwardly inclined surface 17 of the tractor fifth wheel and the king pin 18 carried by the fifth wheel 17 enters the slot 31 and moves rearwardly therein as the tractor continues to back beneath the trailer. During movement of the king pin 18 rearwardly in the trailer skid plate slot 31, the king pin 18 engages the inclined surface 101 of the lock member 94 and forces the lock member to swing upwardly out of the way to permit the king pin to engage in the push rod socket 93 after which the lock member 94 descends by gravity to the position shown in Fig. 8. In this position of the lock member 94, the depending hook portion 97 thereof hooks over the upper flange 98 in the king pin and forwardly thereof. As the tractor backs into the trailer, the push rod 82 is pushed rearwardly and begins to raise the prop 68 toward its upper or retracted position. During the rearward movement of the prop push rod 82 the abutment members or pins 112 carried thereby engage the latch operating arms 110 and swing the latch 106 upwardly thus releasing the brake operating lever 55 which is then pivoted in a counterclockwise direction, see Fig. 8, by the brake shoe springs on the trailer rear wheels. Just prior to releasing of the brakes, the king pin 18 forces the coupling members 34 apart against the action of the springs 47 which then return the coupling members 34 to coupled position. The trailer brakes are released as the vehicles are coupled together and the king pin 18 maintains the position shown in Fig. 4 such that the brake operating rod 102 therein is positioned to engage the end of the lever arm 87 and such that the roller 90 carried by the lever 55 rests on the inclined cam surface 92 of the prop push rod 82.

When the tractor is to be detached from the trailer, the coupling members 34 are first swung back or away from each other by means of the handle 48 and are held in uncoupled positions by lifting the handle 48 to engage it in its retaining notch 54. With the vehicles uncoupled, the tractor now may be pulled away from the trailer and, when this is done, the king pin 18 engaging the inclined surfaces 100 of the hook portion 97 pulls the push rod 82 forwardly so as to cause initial descent of the trailer prop. During this movement of the rod 82 forwardly, the cam surface 92 thereof acting against the roller 90 swings the lever 55 in a clockwise direction, facing Fig. 4. This movement of the lever 55 rotates shaft 36a and through lever 68, toggle device 67, connecting rod 66, levers 65 and 62, connecting rod 61, and brake operating levers 22 applying the brakes of the trailer rear wheels. In applying the brakes, the roller 115 carried by the lower end of the lever 55 is moved to a position such that the latch 106 is permitted to descend automatically or by gravity to a position rearwardly of and engaging the roller 115 thus to latch the lever 55 in brake applying or retaining position, as shown in Fig. 8. During initial forward movement of the rod 82 there is a tendency for the hook member 94 to swing upwardly and detach itself from the king pin 18 but this is prevented during a predetermined movement of the rod 82 by engagement of the hook member with the bosses 56 and 57 and the lever 55. However, when the rod has moved forward a distance such that the axis of the pivoted hook member 94 passes beneath the bosses 56 and 57 the king pin flange 98 acting against the inclined surfaces 100 of the hook member 94 will force the hook member 94 to swing upwardly thus releasing the king pin 18 therefrom after which separation of the vehicles may be completed. Upward movement of the hook member 94 is also then assisted by the transverse member 116 riding up the cam surface 92. While the hook member 94, cooperating with the king pin 18, serves to start initial descent of the prop 68, it will be understood that after such initial start the prop descends by its weight or by gravity to its ground engaging position in which position the upper rods 70 of the prop engages in an opposite pair of the riser notches 76 to support the trailer frame. If it is desired to move a trailer without using a tractor, the trailer brakes may be released by the toggle locking means 67 without unlatching the lever 55 since it will be seen that the toggle means 67 is in effect a take-up means in the linkage between the levers 68 and the brake operating arms 22.

What I claim is:

1. In a trailer vehicle to be coupled to a tractor, a frame supported in part by rear wheels having brakes, a prop for supporting the forward end of the frame, said prop having a raised position, a lever fulcrumed on said frame and operatively connected to the trailer brakes, said lever being operable by means on the tractor for operating the brakes, a push rod operatively connected to said prop, said push rod being movable rearwardly by the tractor backing into the trailer for raising said prop, locking means carried by said frame and engageable with the cooperating means on said push rod and operable for releasably holding said lever in a position to hold the brakes applied when the prop is in lowered position, and means carried by said push rod and operable to release said locking means.

2. In a trailer vehicle to be coupled to a tractor vehicle, a frame supported in part by rear wheels provided with brakes, a prop for the forward end of the vehicle and having a raised position, a lever fulcrumed on said frame and operatively connected to the trailer brakes, a push rod movable longitudinally of said frame and operatively connected to said prop, said rod moving in one direction upon lowering of said prop, cam means movable by said rod upon movement thereof in said one direction and operable to pivot said lever to apply the brakes, locking means operable to hold releasably said lever in brake applying position, and an abutment on said rod for releasing said locking means.

3. In a trailer vehicle to be coupled to a tractor vehicle, a frame supported in part by rear wheels provided with brakes, a prop for the forward end of the vehicle and having a raised position, a lever fulcrumed on said frame and operatively connected to the trailer brakes, a push rod movable longitudinally of said frame and operatively connected to said prop, said rod moving in one direction upon lowering of said prop, cam means movable by said rod upon movement thereof in said one direction and operable to pivot said lever to apply the brakes, and locking means operable automatically by means on said push rod upon forward movement of said push rod for holding said lever in brake applying position.

4. In a trailer vehicle to be coupled to a tractor vehicle, a frame supported in part by rear wheels provided with brakes, a prop for the forward end of the vehicle and having a raised position, a lever fulcrumed on said frame and operatively connected to the trailer brakes, a push rod movable longitudinally of said frame and operatively connected to said prop, said rod moving in one direction upon lowering of said prop, cam means movable by said rod upon movement thereof in said one direction and operable to pivot said lever to apply the brakes, a lock member fulcrumed on said frame and operable to descend by gravity into locking relation with said lever to hold said lever in brake applying position, and means carried by said rod for restraining said lock member prior to lowering movement of said prop.

5. In a trailer vehicle to be coupled to a tractor vehicle, a frame supported in part by rear wheels, a prop for the forward end of said frame and movable between raised and lowered positions, a movable rod operatively connected to said prop and extending longitudinally of said frame, said rod having a socket on its forward end in which a king pin on the tractor engages and moves the rod rearwardly to raise said prop, and a yoke pivoted to the forward end of said rod rearwardly of said socket and having a bifurcated front end portion recessed on its underside to hook over the top of the king pin so that the prop will be pulled down upon separation of the vehicles.

6. In a trailer vehicle to be coupled to a tractor vehicle, a frame supported in part by rear wheels, a prop for the forward end of said frame and movable between raised and lowered positions, a movable rod operatively connected to said prop and extending longitudinally of said frame, said rod having a socket on its forward end in which a king pin on the tractor engages and moves the rod rearwardly to raise said prop, a yoke pivoted to the forward end of the rod rearwardly of said socket and having a bifurcated front end portion recessed on its underside to hook over the top of the king pin so that the prop will be pulled down upon separation of the vehicles, and means restraining upward swinging movement of said yoke during predetermined forward travel of said rod.

7. In tractor-trailer vehicles, a tubular king pin carried by the tractor, coupling means on the trailer cooperable with said king pin for releasably coupling the vehicles together, said trailer supported in part by rear wheels having brakes, a prop for supporting the forward end of the trailer and movable to a raised ineffective position, a reciprocal pin within and projecting above said tubular king pin, said pin being movable from control means on the tractor to actuate the trailer rear wheel brakes, means operatively connecting said movable member and said rear wheel brakes when the tractor and trailer are coupled together, a longitudinally movable member operatively connected to said prop, a hook member pivoted to the forward end of said movable member for hooking over the top of the king pin when the vehicles are coupled together so that when the vehicles are separated the prop will be pulled down, means restraining upward swinging movement of said hook member for a predetermined forward movement of the tractor in separating from the trailer, said hook member having a longitudinal slot opening through the front end thereof to receive said pin.

8. In a trailer vehicle to be coupled to a tractor vehicle, a frame supported in part by rear wheels, a prop for the forward end of said frame and movable between raised and lowered positions, a movable rod operatively connected to said prop and extending longitudinally of said frame, said rod having a socket on its forward end in which a king pin on the tractor engages and moves the rod rearwardly to raise said prop, a member pivoted to the forward end of said rod rearwardly of said socket, and a hook member on said member recessed on its underside to hook over the king pin to pull the prop down upon separation of the vehicles.

9. In a trailer vehicle to be coupled to a tractor vehicle, a frame supported in part by rear wheels, a prop for the forward end of said frame and movable between raised and lowered positions, a movable rod operatively connected to said prop and extending longitudinally of said frame, said rod having a socket on its forward end in which a king pin on the tractor engages and moves the rod rearwardly to raise said prop, a member pivoted to the forward end of the rod rearwardly of said socket, a hook member on said member formed to hook a portion of the king pin so that the prop will be pulled down upon separation of the vehicles, and means restraining upward swinging movement of said first-named member during predetermined forward travel of said rod.

SIDNEY B. WINN.